US010647292B2

(12) United States Patent
Ostreikovskiy et al.

(10) Patent No.: US 10,647,292 B2
(45) Date of Patent: May 12, 2020

(54) SYSTEM AND METHOD FOR BYPASSING A CAR IMMOBILIZER

(71) Applicants: Igor Vladimirovich Ostreikovskiy, Moscow (RU); Aleksandr Aleksandrovich Agalakov, Obninsk (RU)

(72) Inventors: Igor Vladimirovich Ostreikovskiy, Moscow (RU); Aleksandr Aleksandrovich Agalakov, Obninsk (RU)

(*) Notice: Subject to any disclaimer, the term of this patent is extended or adjusted under 35 U.S.C. 154(b) by 0 days.

(21) Appl. No.: 15/630,929

(22) Filed: Jun. 22, 2017

(65) Prior Publication Data

US 2018/0093640 A1    Apr. 5, 2018

(30) Foreign Application Priority Data

Oct. 4, 2016   (RU) .................................. 2016139043

(51) Int. Cl.
*B60R 25/20*    (2013.01)
*B60R 25/04*    (2013.01)
(Continued)

(52) U.S. Cl.
CPC ............ *B60R 25/209* (2013.01); *B60R 25/04* (2013.01); *F02N 11/0807* (2013.01); *G07C 9/00309* (2013.01)

(58) Field of Classification Search
CPC ...... G06K 9/00791; G07C 2009/00984; G07C 2009/0038; G07C 2009/00555;
(Continued)

(56) References Cited

U.S. PATENT DOCUMENTS

2008/0284564 A1* 11/2008 Leitch .................... B60R 25/24
340/5.61
2013/0297194 A1* 11/2013 Wisnia ................ F02N 11/0807
701/113
(Continued)

*Primary Examiner* — Dionne Pendleton
(74) *Attorney, Agent, or Firm* — Inventa Capital PLC

(57) ABSTRACT

The invention relates to automobile transport, specifically, to car protection (security) systems, and provides a method and a system for a safe remote engine start in guarded cars protected against unauthorized use, in case of a car being equipped with an in-built immobilizer. The car immobilizer bypass system comprises two devices, one of them being a key bypass module (4) containing transceiver modules (4.2) and (4.4) controlled by controller (4.1), and the other, a frequency converter (4.3). The transceiver module (4.2) interchanges data with transceiver module (2.1) of the car's security system (2) on preset communication frequency F corresponding to the frequency of data interchange with the transponder. The frequency converter (4.3) is designed with an option of two-way conversion of interchange signals from transceiver module (4.2) to module (4.4) from frequency F to frequency f, and in reverse. The system includes a remote start control device (5) comprising transceiver modules (5.2) and (5.4) controlled by controller (5.1), and a frequency converter (5.3). Module (5.2) ensures data interchange with module (4.4) on frequency f, and the frequency converter (5.3) is designed with an option of two-way conversion of interchange signals from transceiver module (5.2) to module (5.4) from frequency f to frequency F, and in reverse. Module (5.4) provides for the option of data interchange with transponder (1.1) on frequency F. The system allows to perform a remote engine start while enhancing the system of protection against unauthorized use and preserving all the original functions of the car's security system.

6 Claims, 4 Drawing Sheets

(51) Int. Cl.
*G07C 9/00* (2020.01)
*F02N 11/08* (2006.01)
(58) Field of Classification Search
CPC ...... G07C 2009/00793; G07C 2209/63; G07C 9/00309; B60K 35/00; B60Q 1/24; B60R 1/00; B60R 25/24; H04B 7/18539; H04L 5/0007; H04N 7/183; H04W 28/0268; H04W 28/0278; H04W 28/16; H04W 84/06; F02N 11/0807; F02N 99/00; G01S 13/76

See application file for complete search history.

(56) References Cited

U.S. PATENT DOCUMENTS

| | | | |
|---|---|---|---|
| 2016/0006500 A1* | 1/2016 | Radpour | H04B 7/18539 370/319 |
| 2017/0237945 A1* | 8/2017 | Murar | H04N 7/183 348/148 |
| 2018/0072267 A1* | 3/2018 | Shim | B60R 25/24 |

* cited by examiner

SYSTEM AND METHOD FOR BYPASSING A CAR IMMOBILIZER

FIELD OF THE INVENTION

This invention relates to automobile transport, specifically, to car protection (security) systems, and provides a method and a system for a safe remote engine start in guarded cars protected against unauthorized use.

BACKGROUND OF THE INVENTION

Remote engine start is prevented by passive immobilizers installed in cars on a mandatory basis in line with an UN ECE regulation. Starting a car engine is impossible without a key inside the car. On each ignition start the car's security system sends a request to the transponder which is a component of the car key, through its transceiver module (FIG. 1). The radius of interaction between the security system's transceiver module and the car key transponder varies from several centimeters to several meters (but in any case is confined to the inner space of the car). Once the interchange of correct data between the car key transponder and the transceiver module of the car's security system is completed, and the presence of the car key inside the car is verified, the operation of the car start control device is allowed, and the engine is started. Depending on the type of the key (ordinary (passive) key without its own power unit, or a "smart key" (active) with an in-built power supply) the data interchange between the key transponder and the transceiver module is effected on the carrying frequency F (120-140 kHz (ordinary key)) or on a radio frequency allowed for use, such as 434 Mhz, 868 Mhz or any other ("smart key").

A method is available to bypass the standard in-built immobilizer for a remote engine start (i.e., with no key inside the car) based on the concept of connection to the car's critical circuits whereby an additional device (keyless bypass module) emulates the data interchanged during the transponder's identification of the car key (for instance, see Patent CA 2704810 C, Nov. 15, 2011). In other words, the start permission signals are substituted. The additional remote start device first transmits a command to bypass the immobilizer to the key bypass module which permits to start the engine (FIG. 2). Because the start permission signals are coded by the car manufacturer, a necessary condition for using such a method is the preliminary decoding of the data interchange protocol ("cracking" the interchange protocol) by re-engineering.

In that case, given the advances in security systems and coding procedures, potential compatibility of such devices with present-day cars would be reduced, since it might prove impossible to perform the decoding in a reasonably short time.

Another method of deactivating the security system is the so-called "transformer by passer" consisting of an inductive transformer one of whose coils is wrapped around the key (or its transponder) hidden inside the car, and the other is located close to the transceiver module. Such devices are widely known (for example, see http://www.mega-f.ru/common/img/uploaded/BP2-instr-0.pdf; http://lzr.ru/files/uploads/documents/instructions/immotrack/PandoraDI03.pdf; http://ultrastar.ru/attachment/37713/StarLine_BP03.pdf).
Prior to a remote start the additional remote start module transmits a signal to the transformer by passer that restores the integrity of the transformer circuit thus allowing data interchange between transponder 2 and the transceiver module of the security system and enabling the engine start (FIG. 3). One obvious disadvantage of such a solution is the necessity of leaving the car key (or its transponder) inside the car resulting in the risk of the car's theft.

The closest analogue of our method is U.S. Pat. No. 8,264,320 B2 dated Sep. 11, 2012. This invention proposes to place two separate modules in the car (key storage module and remote start and key bypass module) with subsequent data interchange between them. Both aforementioned modules are controlled from an external remote start control device. Placing the car key with transponder 2 in a shielded key storage module effectively reduces the radius of its identification preventing direct communication between the transceiver module of the security system and transponder 2. All the data to be interchanged between transponder 2 and the security system's transceiver module are relayed through the remote start and key bypass module. Communication between the key storage module and the remote start and key bypass module may be carried out, inter alia, by data interchange through a wireless (radio) channel (FIG. 4).

All the known solutions for bypassing the car immobilizer reduce the security of anti-theft systems since they all require that the car key (or its transponder) be left inside the car which results in the obvious risk of the car's theft.

The task posed by the claimed invention is the development of a technical solution for bypassing a car immobilizer not depending on possible changes in the coding of data permitting a car start, and not requiring the storage of the car key (or its transponder) inside the car.

The technical result of the claimed invention would be an unconditional and safe remote start of the car engine while preserving all the original functions of the car's security system, thus expanding the spectrum of available technical tools aimed at enhancing security systems protecting against unauthorized use.

DETAILED DESCRIPTION OF THE INVENTION

Figure 1:
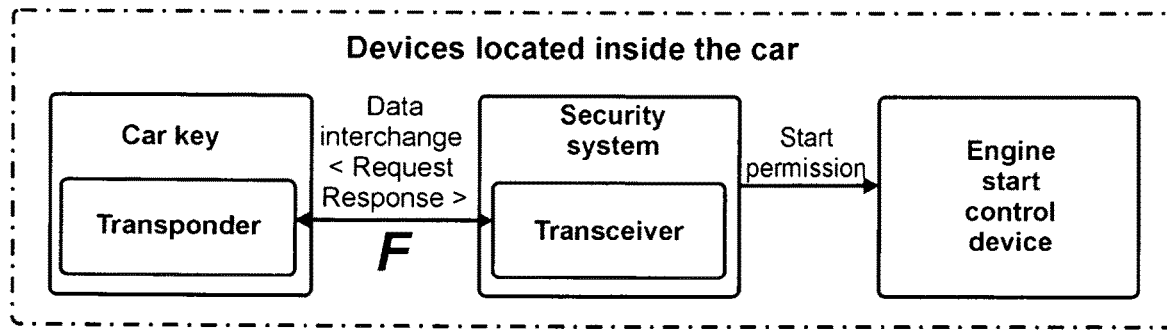
FIG. 1 shows a first schematic view of a device located inside a car.
Figure 2:
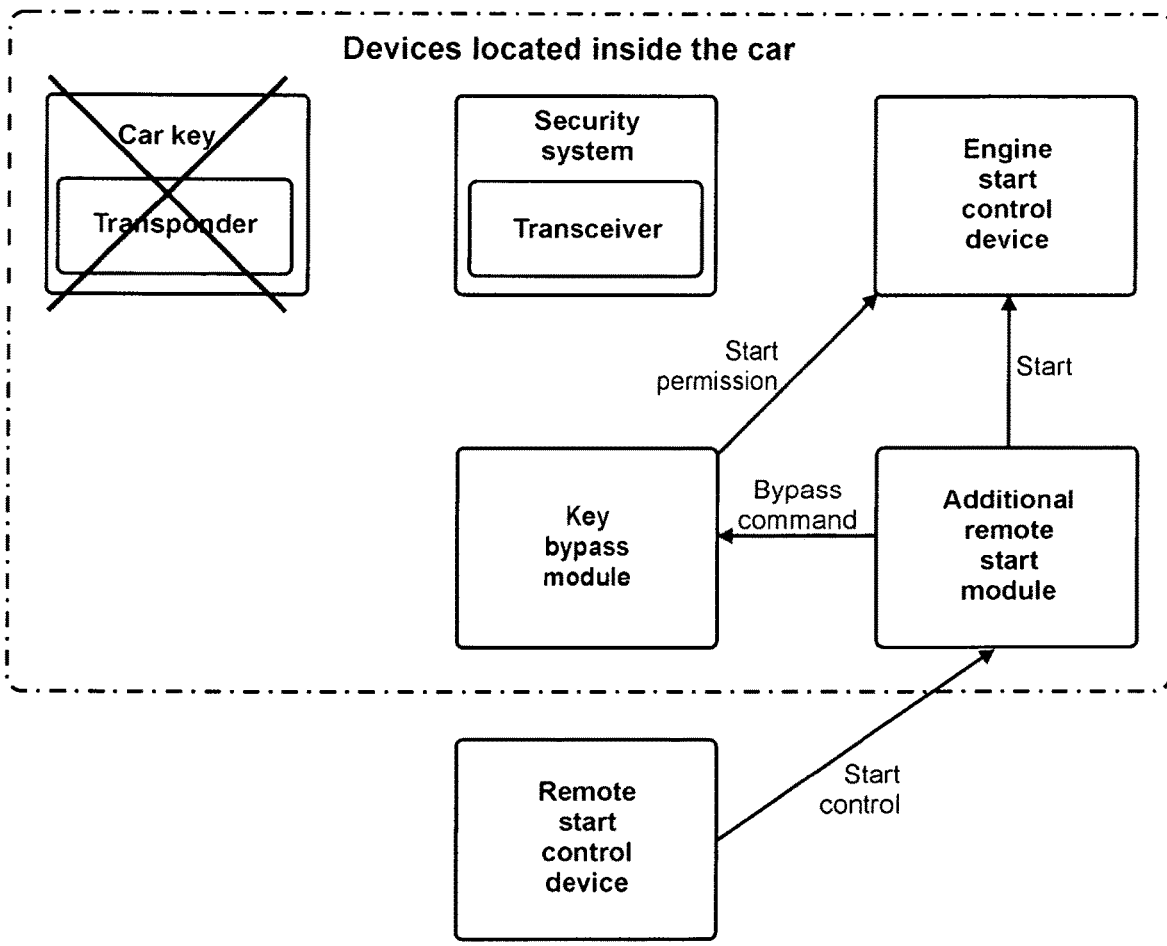
FIG. 2 shows a second schematic view of a device located inside a car.
Figure 3:
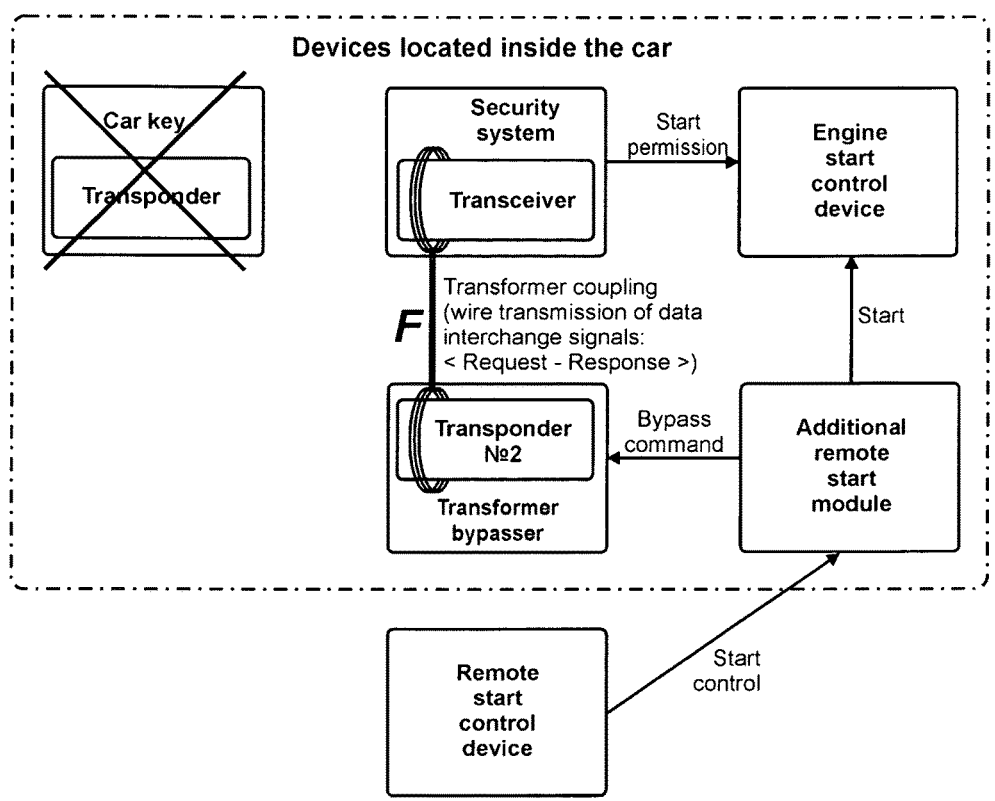
FIG. 3 shows a third schematic view of a device located inside a car.
Figure 4:
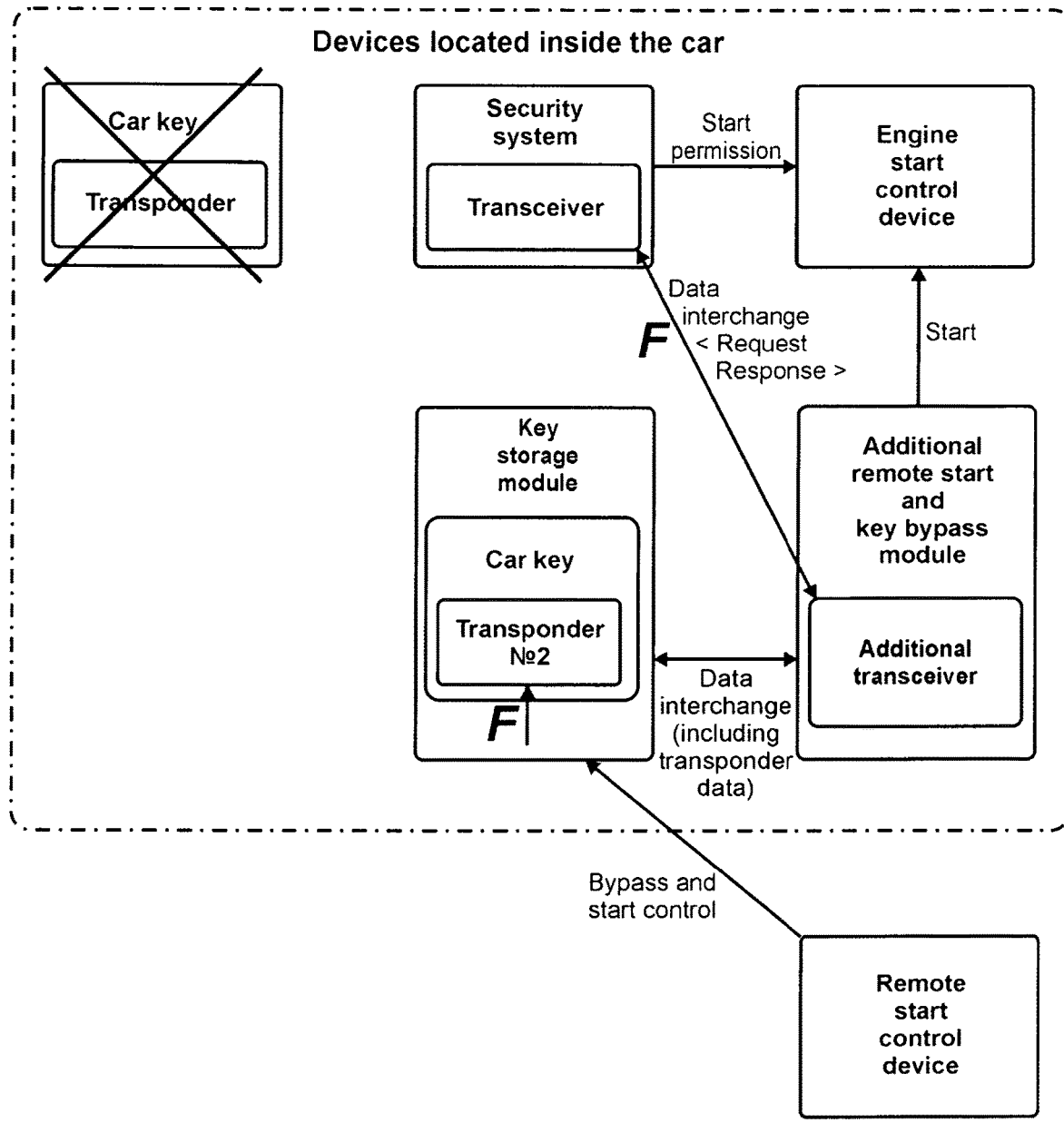
FIG. 4 shows a forth schematic view of a device located inside a car.

To achieve that result the immobilizer bypass system includes two components one of which is the key bypass module (4) with an the option of installation inside the car and comprising transceiver modules (4.2) and (4.4) controlled by controller (4.1), and a frequency converter (4.3), with transceiver module (4.2) interchanging data with transceiver module (2.1) of the car's security system (2) on the preset frequency F corresponding to the frequency of data interchange with the transponder, and the frequency converter (4.3) capable of two-way conversion of interchange signals from transceiver module (4.2) to module (4.4) from frequency F to frequency f, and in reverse. The system also includes a remote start control device (5) located outside the car and consisting of transceiver modules (5.2) and (5.4) controlled by controller (5.1), and a frequency converter (5.3), with transceiver module (5.2) interchanging data with transceiver module (4.4) on frequency f corresponding to the frequency of data interchange with the transponder, and the frequency converter (5.3) capable of two-way conversion of interchange signals from transceiver module (5.2) to module (5.4) from frequency f to frequency F, and in reverse; the transceiver module (5.4) also provides for the option of data interchange with transponder (1.1) on frequency F.

The transponder is either a part of the car key, a separate device or a structural element of the remote start control device (5). In addition, the key bypass module (4) and the remote start control device (5) may be designed with an option of preliminary coding/decoding of signals sent through transceiver module (4.4) and transceiver module (5.2) by means of controller (4.1) and controller (5.1), respectively. The key bypass module (4) may also provide for the option of combining the immobilizer bypass function and the function of initiating interchange at the "car-key" level, meaning that key bypass module (4) may, at the external command signal from the remote start control device (5), or based on at least one measured parameter, such as engine temperature, car inside temperature, an accumulator (a battery) voltage, time elapsed since the previous start, or by activation of one or several lines, such as "key in lock", ignition key position "Power supply to users achieved", "ignition on", initiate data interchange between the car's security system (2) and the transponder (1.1), through the key bypass module (4) and the remote start control device (5). Furthermore, the key bypass module (4) is designed with an option of the start control function transmitting to the start control device (3) a set of signals or commands for starting the engine. Data interchange signals between the transceiver module (4.4) and transceiver module (5.2) may be transmitted through distributed data transmission networks, such as mobile phone networks: GSM-850/900/1800/1900, UMTS (3G), 4G, CDMA, or through Bluetooth, ZigBee, Wi-Fi or DECT. Additionally, data interchange with the transceiver module (2.1) of the car's security system (2) may be carried out directly by connection to its antenna.

Also, to achieve the technical result in bypassing the car immobilizer, the key bypass module (4) may be installed in the car and be capable of carrying out data interchange with the transceiver module of the car's security system (2) on the preset frequency F corresponding to the frequency of data interchange with the transponder; the key bypass module (4) may also be capable of carrying on interchange of data converted from frequency F to frequency f, and in reverse, with the remote start control device (5) on frequency f. The remote start control device (5) is capable of converting data from frequency f to frequency F and in reverse, and also of carrying on data interchange with the transponder (1.1) on frequency F. In addition, the key bypass module (4) and the remote start control device (5) are capable of preliminary coding/decoding of signals sent between them. The key bypass module (4) is also capable of combining the immobilizer bypass function and the function of initiating interchange at the "car-key" level, meaning that the key bypass module (4) may, at the external command signal from the remote start control device (5), or based on at least one measured parameter, initiate data interchange between the car's security system (2) and the transponder (1.1), through the key bypass module (4) and the remote start control device (5). Furthermore, the key bypass module (4) is designed with an option of the start control function for transmitting to the start control device (3) a set of signals or commands for starting the engine. Also, the key bypass module (4) and the remote start control device (5) may provide for the option of data interchange through distributed data transmission networks, such as mobile phone networks: GSM-850/900/1800/1900, UMTS (3G), 4G, CDMA, or through Bluetooth, ZigBee, Wi-Fi or DECT. In addition, the key bypass module (4) may be designed with an option of data interchange containing transponder request/response signals with the transceiver module of the car's security system (2) by direct connection to the transceiver's antenna.

Figure 5:
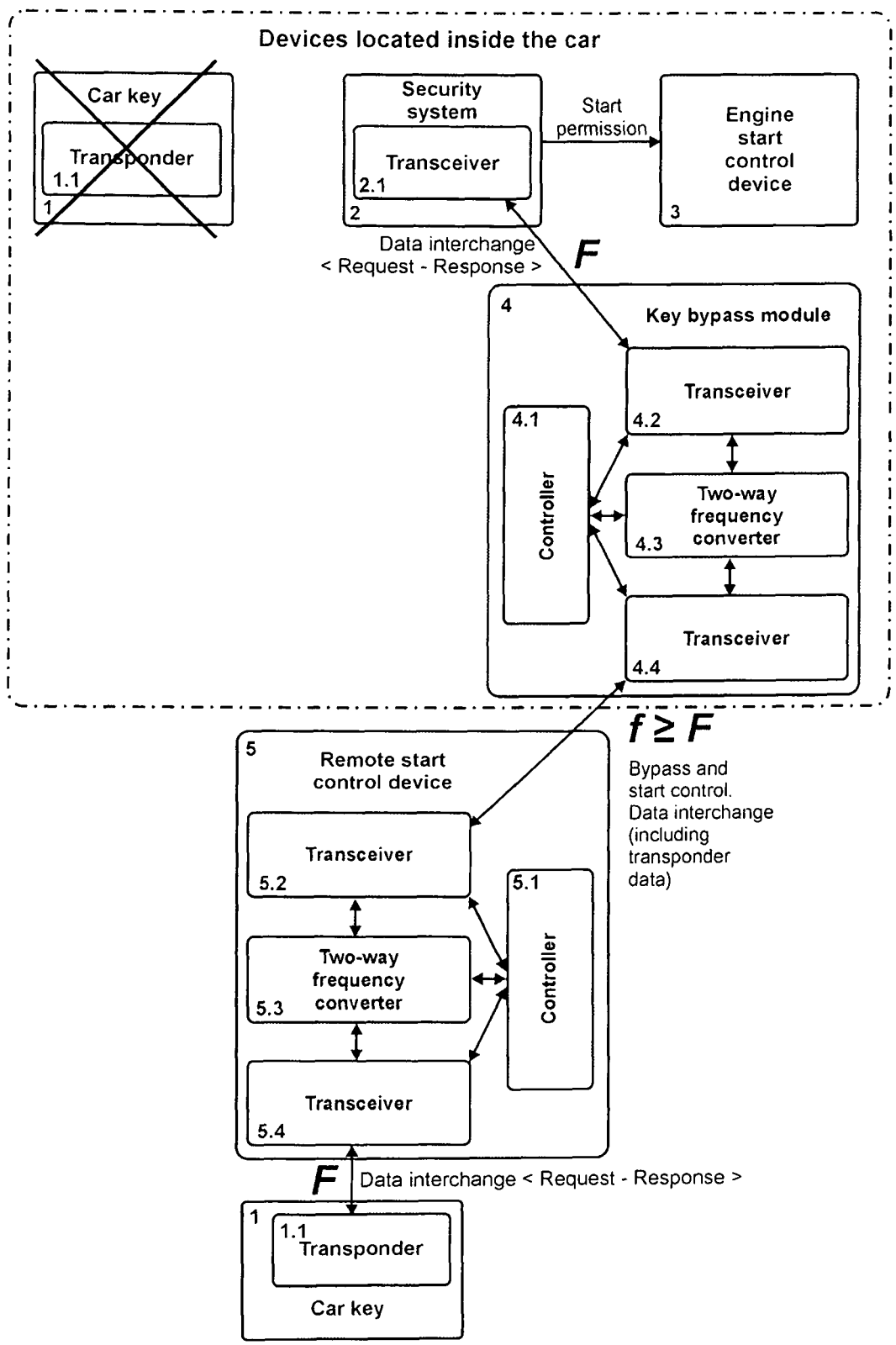
FIG. 5 shows a fifth schematic view of a device located inside a car.

The essence of the invention is explained in FIG. 5 which describes the immobilizer bypass system connected with the car's security system and the engine start control device.

Brief description of items in FIG. 5: 1—car key, 1.1—transponder, 2—car's security system, 3—engine start control device, 4—key bypass module (immobilizer bypass), 4.1—key bypass module controller, 4.2—key bypass module transceiver, 4.3—two-way frequency converter from F to f and in reverse, 4.4—key bypass module transceiver, 5—remote start control device, 5.1.1—remote start control device's controller, 5.2—remote start control device's transceiver, 5.3—two-way frequency converter from f to F and in reverse, 5.4—remote start control device's transceiver.

The system operates in the following way. At the attempt to activate remote start or programmed start, depending on the temperature of the engine or inside the car, the timer, etc., the car's security system sends a request to the transponder which is a component of the car key, a separate device or a structural element of the remote start control device (5), through its transceiver module (2.1). Normally data interchange between the key transponder (1.1) and the transceiver module (2.1) of the car's security system is effected on the carrying frequency F (120-140 kHz (ordinary key)) or on a radio frequency allowed for use, such as 434 Mhz, 868 Mhz or any other ("smart key"). The car has installed in it a key bypass module (4) which receives the request from the transceiver module (2.1) on frequency F, converts the signal to frequency f and transmits it through the transceiver module (4.4) to the transceiver module (5.2) of the remote start control device (5) on frequency f. In the remote start control device (5) the request signal is converted to frequency F and is transmitted through the transceiver module (5.4) on frequency F for data interchange with the transponder (1.1). Having received the request signal on frequency F, the transponder (1.1) transmits the response signal on the same frequency to the transceiver module (5.4.) which receives and transmits that signal to the frequency converter (5.3) that converts the signal to frequency f for transmission through the transceiver module (5.2) to the transceiver module (4.4) of the key bypass module (4). The signal on frequency f from the transceiver module (4.4) is received by the frequency converter (4.3) that converts the signal to frequency F for transmission through the transceiver module (4.2) to the transceiver module (2.1) on frequency F. Once the interchange of correct data between the car key transponder bypass module and the transceiver module of the car's security system is completed, thus verifying the presence of the car key inside the car, the operation of the car start control device is allowed, and the engine is started. This method and system of immobilizer bypass ensures the preservation of anti-theft features and maximum secrecy for the remote engine start.

Signal transmission frequency f is selected based on the conditions and possibilities of signal transmission, and can correspond to one or several permitted communication frequencies; the signal can also be transmitted through mobile phone networks (GSM-850/900/1800/1900, UMTS (3G), 4G, CDMA), or through Bluetooth, ZigBee, Wi-Fi or DECT.

Additionally, data interchange containing transponder request/response signals between the key bypass module (4) and the transceiver module of the car's security system (2) can be carried out by direct connection to the transceiver's antenna.

The application of the immobilizer bypass system and method guarantees the remote start of the car engine while enhancing the system of protection against unauthorized use and preserving all the original functions of the car's security system.

What is claimed is:

1. A car immobilizer bypass system comprising:
two components one of which is a key bypass device with an option of installation inside the car and including:
first and second transceiver devices and controlled by a controller, and
a frequency converter,
with the first transceiver device interchanging data with a transceiver device of the car's security system on preset frequency F corresponding to the frequency of data interchange with a transponder,
the frequency converter being capable of two-way conversion of interchange signals from said first transceiver device to said second transceiver device from frequency F to frequency f, and in reverse,
the system also including:
a remote start control device located outside the car and comprising:
third and fourth transceiver devices and controlled by a controller, and
a second frequency converter, with the third transceiver device interchanging data with the second transceiver device on frequency f,
the second frequency converter being capable of two-way conversion of interchange signals from said third transceiver device to said fourth transceiver device from frequency f to frequency F, and in reverse, the fourth transceiver device also being capable of data interchange on frequency F with the transponder which is either a part of the car key, a separate device or a structural element of the remote start control device.

2. The car immobilizer bypass system of as set forth in claim 1, wherein the key bypass device and the remote start control device are designed with an option of preliminary coding/decoding of signals sent through transceiver device and transceiver device by means of controller and controller, respectively.

3. The car immobilizer bypass system of as set forth in claim 1, wherein the key bypass device is capable of combining the immobilizer bypass function and the function of initiating interchange at the "car-key" level, meaning that key bypass device can, at the external command signal from the remote start control device, or based on at least one measured parameter, such as engine temperature, car inside temperature, accumulator voltage, time elapsed since the previous start; or by activation of at least one line, such as "key in lock", ignition key position "Power supply to users achieved", "ignition on", initiate data interchange between the car's security system and the transponder, through the key bypass device and the remote start control device.

4. The car immobilizer bypass system of as set forth in claim 1, wherein the key bypass device is designed with an option of the start control function being able to transmit to the start control device a set of signals or commands for starting the engine.

5. The car immobilizer bypass system of as set forth in claim 1, wherein data interchange signals between the transceiver module and transceiver device are transmitted through distributed data transmission networks, such as mobile phone networks: GSM-850/900/1800/1900, UMTS (3G), 4G, CDMA, or through Bluetooth, ZigBee, Wi-Fi or DECT.

6. The car immobilizer bypass system of as set forth in claim 1, wherein in addition data interchange with the transceiver device of the car's security system may be carried out directly through the car's electronic circuits.

* * * * *